(12) United States Patent
Soroushian et al.

(10) Patent No.: US 8,510,303 B2
(45) Date of Patent: Aug. 13, 2013

(54) SINGULAR, COLLECTIVE AND AUTOMATED CREATION OF A MEDIA GUIDE FOR ONLINE CONTENT

(75) Inventors: Kourosh Soroushian, San Diego, CA (US); Dan Salmonsen, San Diego, CA (US); Porfirio Landeros, San Diego, CA (US); Shaiwal Priyadarshi, San Diego, CA (US); Francois Gravel, San Diego, CA (US)

(73) Assignee: DIVX, LLC, Santa Clara, CA (US)

( * ) Notice: Subject to any disclaimer, the term of this patent is extended or adjusted under 35 U.S.C. 154(b) by 0 days.

(21) Appl. No.: 12/684,002

(22) Filed: Jan. 7, 2010

(65) Prior Publication Data

US 2010/0250532 A1   Sep. 30, 2010

Related U.S. Application Data

(60) Provisional application No. 61/143,114, filed on Jan. 7, 2009.

(51) Int. Cl.
*G06F 17/30* (2006.01)

(52) U.S. Cl.
USPC .......................................... 707/736; 709/201

(58) Field of Classification Search
USPC ................... 709/201; 715/201; 707/736
See application file for complete search history.

(56) References Cited

U.S. PATENT DOCUMENTS

| | | | |
|---|---|---|---|
| 2005/0108320 A1* | 5/2005 | Lord et al. | 709/201 |
| 2007/0044010 A1* | 2/2007 | Sull et al. | 715/500.1 |
| 2008/0005175 A1 | 1/2008 | Bourke et al. | |
| 2008/0066099 A1 | 3/2008 | Brodersen et al. | |
| 2008/0086456 A1 | 4/2008 | Rasanen et al. | |
| 2008/0086747 A1 | 4/2008 | Rasanen et al. | |
| 2008/0195664 A1 | 8/2008 | Maharajh et al. | |

FOREIGN PATENT DOCUMENTS

WO   2010/080911 A1   7/2010

OTHER PUBLICATIONS

Lifehacker—Boxqueue Bookmarklet Saves Videos for Later Boxee Watching, printed Jun. 16, 2009 from http://feeds.gawker.com/~r/lifehacker/full/~3/OHvDmrIgZZc/boxqueue-bookmarklet-saves-videos-for-late-boxee-watching, 2 pgs.
International Application Serial No. PCT/US2010/020372, Search Report mailed Mar. 1, 2010, 2 pgs.
International Application Serial No. PCT/US2010/020372, Written Opinion mailed Mar. 1, 2010, 5 pgs.

* cited by examiner

*Primary Examiner* — Huawen Peng
(74) *Attorney, Agent, or Firm* — KPPB LLP

(57) ABSTRACT

Systems and methods are provided in which a content guide includes one or more tags associated with a single user, a group of users or a channel subscribed to by users that enables the retrieval of content for subsequent viewing and which can be supplemented by recommendations and data from other sources.

21 Claims, 4 Drawing Sheets

SINGULAR, COLLECTIVE AND AUTOMATED CREATION OF A MEDIA GUIDE FOR ONLINE CONTENT

CROSS REFERENCE TO RELATED APPLICATIONS

The application claims the benefit of U.S. Provisional. Patent Application No. 61/143,114, filed Jan. 7, 2009, the entire disclosure of which is hereby incorporated by reference as if set forth in full herein.

BACKGROUND

The present invention generally relates to digital content distribution systems and in particular to media content systems that generates, distributes and uses media content guides.

The availability of Internet content has dramatically reshaped the landscape for how a user acquires, interacts with, and ultimately consumes content. Numerous websites today host audio and video programs, ranging from user-generated videos, news-reports and podcasts, to prime-time and syndicated full-length television shows and movies in high definition. The number of these offerings through different Internet portals is ever expanding, with each website pursuing a different business model in an effort to monetize their content offering.

Therefore, there has become a need to identify, maintain and distribute content that maximizes the consumption and display of such content as well as provide efficient distribution of such content.

SUMMARY

Generally, guide creation, access and distribution content systems and methods are provided. In one embodiment, a content guide system is provided. The system comprises a content server, a tag server, a tagging device and a playback device. The content server is configured to provide access to content. The tag server includes a searchable database of tags. The tagging device is in network communication with the tag server and the content server, where the tagging device is configured to access content via the content server and to automatically generate at least one tag referencing the accessed content that is provided to the tag server for inclusion into the searchable database of tags. The playback device is in network communication with the tag server and the content server, where the playback device is configured to search the database; retrieve, from the database, a tag that references content accessible via the content server and access the content referenced by the retrieved tag via the content server.

In various embodiments, each tag includes an identifier of the content and location information of the content where the identifier is a unique database identifier and the location information is associated to a uniform resource identifier. In other embodiments, the identifier and the location information is substantially smaller in size than the content. In one embodiment, the tags do not include a temporal component that describes or references a particular time or date in which the content is available for consumption. In other embodiments, the tags are a subset of data within a database having data unrelated to the tags and the content in which the tags refer. In another embodiment, the tags include at least one identifier associating the tags to a specific content guide within the database and in a further embodiment the database is larger in size than the database of tags.

In another embodiment, a method of accessing content distributed throughout a network is provided. The method comprises generating a tag referencing a piece of content accessible via a content server using a tagging device; adding the generated tags to a searchable database of tags by a tag server; and accessing the database, selecting at least one tag and retrieving content from the content server referenced by the retrieved tag by a playback device.

Many of the attendant features of the present invention will be more readily appreciated as the same becomes better understood by reference to the foregoing and following description and considered in connection with the accompanying drawings.

DETAILED DESCRIPTION

With an expanding selection of content from differing Internet portals, a content guide in accordance with an embodiment of the invention provides a tool for navigating the plethora of the available content. The content guide in one embodiment is a queue or database of tags associated with a single user, a group of users or a channel subscribed to by users that enables the retrieval of content for sequential and/or subsequent viewing and in other embodiments is a navigable listing of tags referencing content that can enables access to content via searching, and/or categorized directories and which is supplemented by recommendations and data from third party sources. A guide in accordance with an embodiment of the invention can be created by a user while he or she navigates different portals using a browser that includes plug-in software, javascript or another similar interface enabling the user to mark different audio or video content for later viewing. These tags can be saved locally or on a network account and subsequently accessed through a web browser or by another application on a personal computer or a consumer electronics device capable of accessing those tags and presenting the selected content on a platform such as a digital television. In many embodiments, the decoding of the content is performed by the device using the guide to access content. The guide simplifies the retrieval of content across a large number of sites and enables viewing of content on multiple devices.

In accordance with various embodiments of the invention, the media content guide enables sharing of tagged content within an online community, and the formation of collections of tags based on the community's recommendations. The community's tags can also be coupled with an individual's preferences to create recommendations for online content consumption. In addition, a user's personal preferences may be used by a remote or recommendation server which scans existing and newly added content, such that recommendations can be created for the user on a periodic basis.

Systems and methods in accordance with embodiments of the invention create a set of tags or markers related to content on the Internet or network along with any related information. The tags form a media guide that is ready for subsequent recollection and use by an individual to access and play the encompassed content. This media guide can be created in many ways, such as individual interaction, cooperation of a community of users, or through an automated system tailored to each individual's or community's preferences. The information gathered on the individual or collective content-consumption habits can be subsequently used to develop additional content and/or goods and services offerings for specific users or classes of users.

Figure 1:
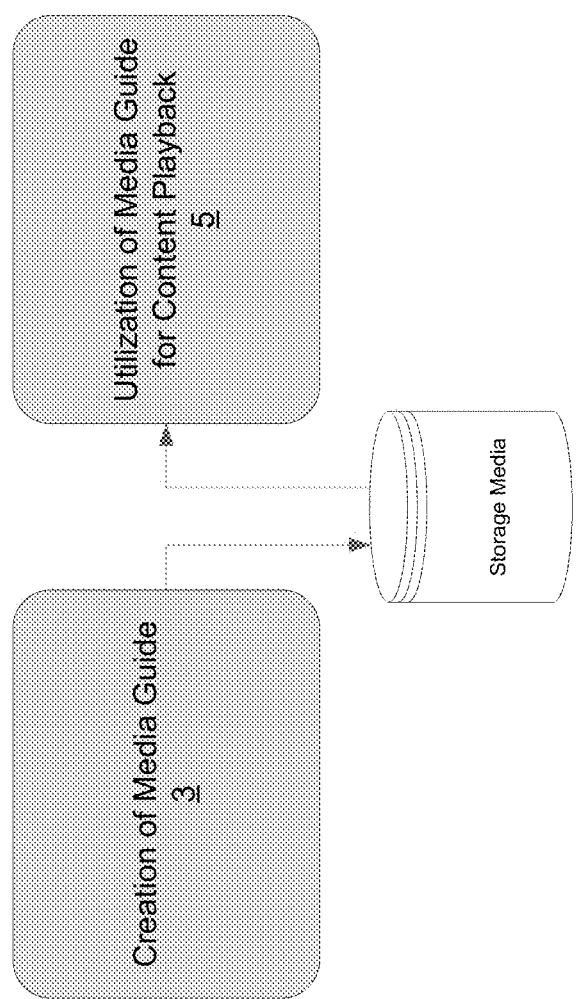
FIG. 1 is a block diagram illustrating an overview guide generation and utilization process in accordance with various embodiments of the present invention.

Program directories, libraries or guides in accordance with embodiments of the invention are constructed in several distinct parts, the collection of which aid in the creation of a guide for accessing online content on a personal computer, mobile phone, or a consumer electronics device. In various embodiments, as shown in FIG. 1, the process occurs at two distinct steps: The creation of the guide, where a distinct set of content have been selected (3), and the utilization of the guide for accessing the selected content playback (5). The term content is used herein to refer to any audio, video, image, or multimedia files or presentations which can be either downloaded or consumed directly via a web-browser or other application for viewing media content, plus any data describing those presentation or files (e.g., metadata).

Figure 2:
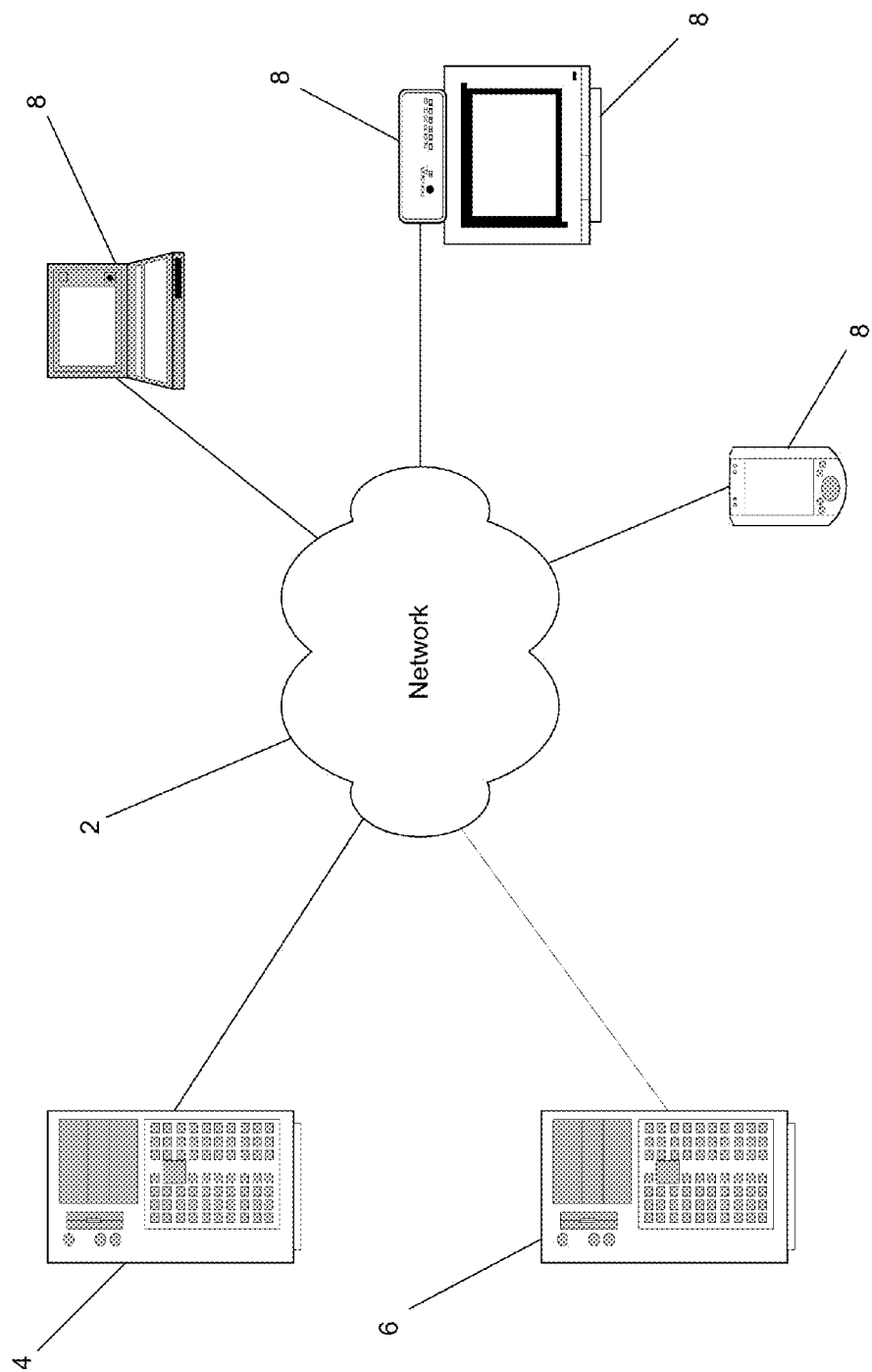
FIG. 2 is a block diagram of a guide creation, access and distribution multimedia system in accordance with various embodiments of the present invention.

Turning now FIG. 2 in which a conceptual system drawing of the content guide system is shown. Content is distributed throughout a network 2. The network 2 can be the Internet, one or more wide area networks, one or more local area networks or any combination thereof. Within and/or coupled to the network are one or more servers 4, e.g., web servers, media servers, and similar devices or services 6, such as messaging services, microblogs, feed systems or other similar systems, that are in control or at least able to access content distributed in the network. In various embodiments, servers or services can be separated or distinguished as content servers that provide access and/or contain content, tag servers that provide one or more searchable databases of tags referencing the content or a combination of both. Playback devices 8, such as mobile phones, televisions, computers, media players, and various other devices capable of playing back and displaying the content, are also included within and/or coupled to the network. Tagging devices are also included with or separately from the playback devices in which the tagging devices are capable of tagging the content. One or more searchable tag databases or guides are created and stored throughout the network to provide quick and universal access to the content by the playback devices and through the server and/or services. It should be appreciated that playback devices as described throughout the description can in various embodiments also refer to tagging devices and servers or services to content and/or tag servers or services.

It should also be appreciated that in creating the media guide, only markers and/or a limited set of information about or referring to the content are utilized, and the actual content in its entirety is not used in making the guide. Information related to the content may include but is not limited to: its title, creation time, genre, creator, static or animated thumbnails, and optionally a subset of the content provided in its original format or transformed into a different format.

Guide Creation

The user may individually traverse any site which offers content and add access markers for that content to a database which is later used for creating the guide. In a number of embodiments, the user accesses the sites using a browser application that includes a plug-in or through a JavaScript, which provides the functionality of identifying media embedded within the webpage, providing a user interface enabling the tagging/untagging of media and extracting information related to the media from the web page. When marking the individual contents on a web portal, the page which presents that content and information related to it for consumption or downloading it may be dynamically augmented to present an interface which then enables the addition of that content to the user's media guide. Once added, the web page may be dynamically augmented to note that the content has been added to the user's media guide. When revisiting the same web page, the user may be allowed to remove content that has already been added to his or her media guide.

Figure 3:
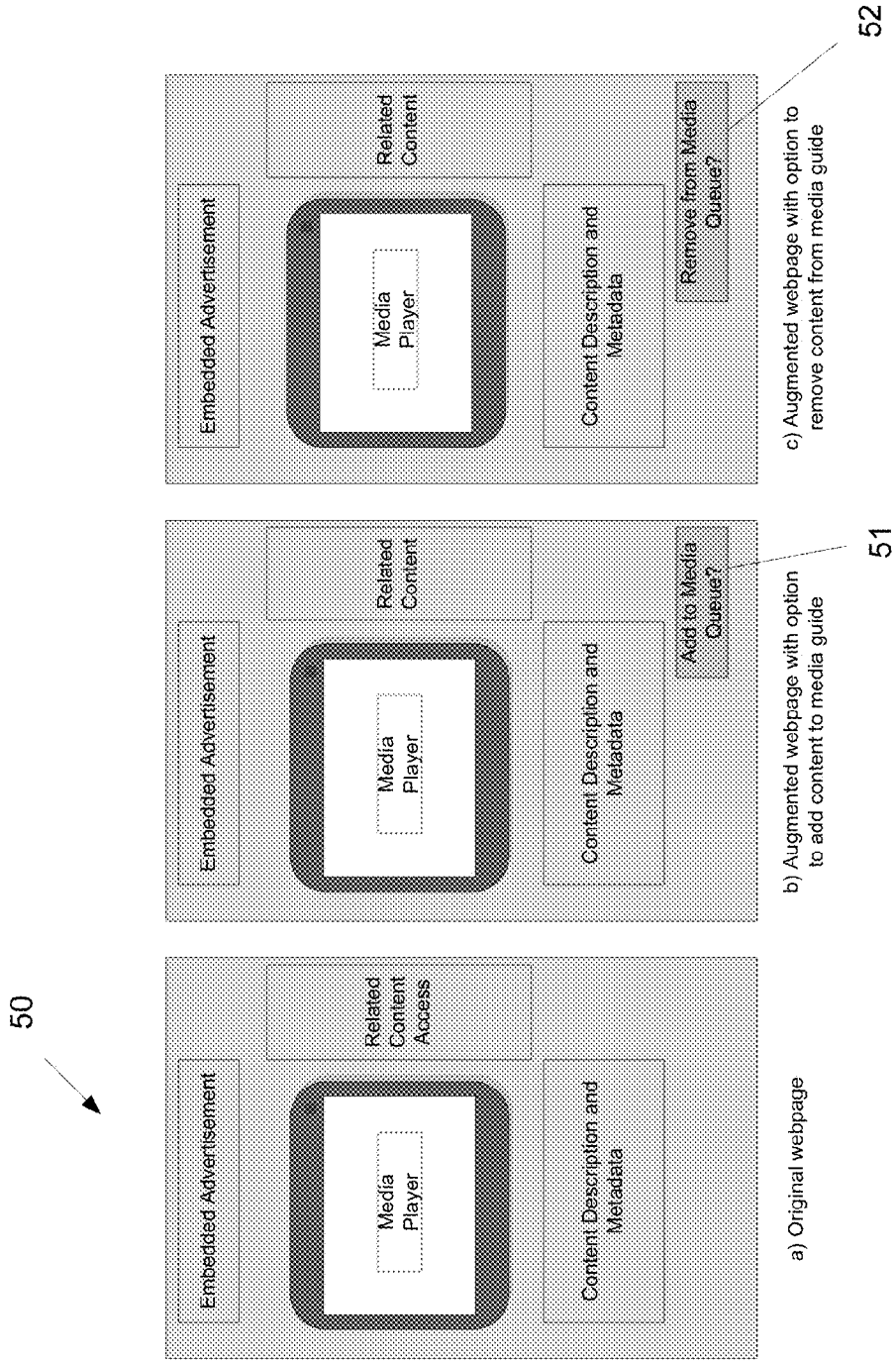
FIG. 3 is a graphical representation of tagging content in accordance with various embodiments of the present invention.
Figure 4:
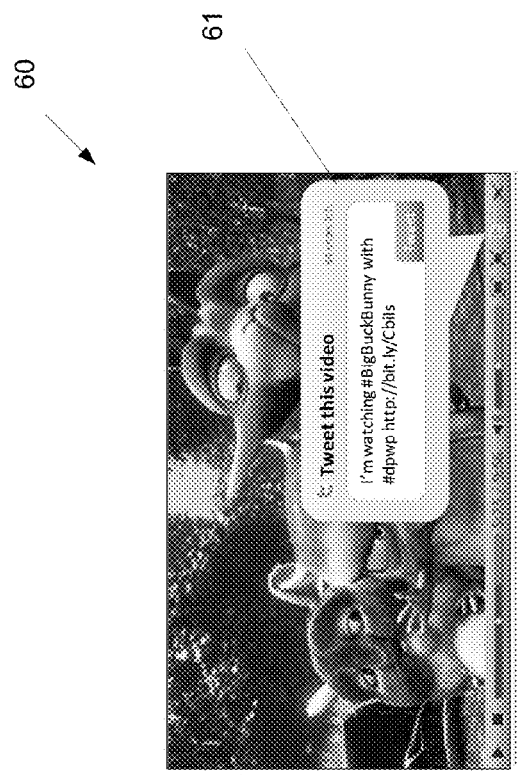
FIG. 4 is a graphical representation of tagging content in accordance with various embodiments of the present invention.

FIG. 3 provides an example of a web-page 50 where media may be presented to a user. Here, we see that the original page may be augmented to present the user with an option to add the content to their media queue 51 via augmentation of the original webpage. Where content has already been added to the database, the user may be presented with an option to remove the content from their media database or queue 52. In several embodiments, the browser plug-in or JavaScript can also communicate the information to a remote device such as a server that maintains a content guide on behalf of the user. FIG. 4 illustrates another example of tagging content 60 via a messaging service. As shown, a browser plug-in or JavaScript in accordance with an embodiment of the invention has automatically pre-filled the tweet or message 61 providing such a message as "I'm watching #[video hash tag] with #divxweb [shortened URL]". The shortened URL is generated using a URL shortening service to provide the location of the content, which is typically a different identifier to that of a web page in which the content is embedded, and the video hash tag (#divxweb) is provided as an embedded code parameter to identify the content, both of which are not be editable by the user. In one embodiment, the hash tag is generated from information related to the content, e.g., utilizing the filename, metadata and other similar content identifiers. Although a specific short message format is shown in FIG. 4, alternate messages appropriate to an application can also be utilized in accordance with embodiments of the invention. In various embodiments, an interface is provided to mark content that may be unplayable using with the playback device or player to be subsequently played on another device capable of playing the content. For example, a mobile phone searching or browsing a website through a javascript can tag content, such as a user can input an e-mail address through which the tagged content can be shared or marked to be added to the media guide. The content can then be accessed later via the guide or e-mail on a computer or similar device that is capable or better suited for playing the tagged content.

In one embodiment, the user may choose to share his or her media guide with other people via any electronic means such as email or as part of a service offered by a social group website, an online community, or an application that aggregates messages based upon identifiers including but not limited to hash tags. Tags can be shared by direct upload to the servers of the social group website via an API or can be shared by uploading to media guide server that then provides tagged content information from users to the servers of the social group website via an API. During the process of sharing, the user may recommend particular selections from the media guide, or alternatively share the entire guide with other members of his/her electronic community. Likewise, the user may receive recommendations or complete guides from his/her online community, with or without sharing any of his/her guide information. As a result, a media guide may be built upon the recommendations of members of an online community and filtered based on a set of predetermined metrics selected by the user or otherwise determined algorithmically by taking in metrics such as the user's demographics, the contents of his/her personal media guide, etc.

A service in one embodiment offers each individual customization capabilities based on his or her preferences or based on the content of their personal or collective media guide. Alternatively, separate guides may be available for access by users based on preset categories which groups like content together based on specific characteristics such as genre, type, production year, subject, etc. A list of web portals may be processed in an automated fashion in part or whole and content markers added to the user's media guide and/or a general guide. Again, this media guide may be populated by a set of predetermined metrics selected by the user or otherwise determined algorithmically by taking in metrics such as the user's demographics, the contents of his/her personal and collective media guides, etc. This service may operate on a remote server, on a user's computing platform, or a combination thereof.

In one embodiment parts of the system are configurable to access new web portals chosen by the user through an augmentation of the cataloging process used by the service. This augmentation may be added through additional instructions presented in the form of a platform-independent interpreted language, or through the addition of object and binary code to the original software of the service. The instructions supporting this augmentation can come from a third party source or the original distributor of the service, or a combination thereof.

The media guide may be created locally on storage media associated with the user's computing platform, or alternatively created on storage media associated with a remote server which can be accessed by the user. When an automated service or server is creating the guide, the service accesses the user's media guide on a predetermined storage media. Regardless of the location of the media guide, the playback device possesses the capability of accessing the media guide such that it can present the user with the media guide and allow the user to view part or all elements of the guide and select the consumption of content through the markers or tags which are available in the guide. In a number of embodiments, the guide is resident on a first device that is accessible over a local network via a second device. In various embodiments, the guide is resident on a server that is accessible over the Internet via a viewing device. In both instances, the device accessing the guide uses the tags within the guide to retrieve the content corresponding to specific tags via the Internet.

Content Access

The creation of the guide and access to the guide are typically separate in time, and may be composed in separate locations and on different device categories. During a time gap, a pre-caching of content can take place. For example, some or all of the tagged content can be progressively downloaded onto local storage which is accessible by the playback device and/or to direct the pre-caching (manually or intelligently) to the appropriate or desired device in an ecosystem where a user has multiple devices capable of accessing the guide. Where applicable (such as the case of popular content), the use of peer-to-peer technologies may be used to reduce the bandwidth load on the originating content server. These provisions may not be necessary for a basic usage of the media guide which is the direct streaming of content based on the content marker tags of the media guide.

The creation of a media guide can provide certain information about a user's viewing preferences and the types of content that they like to playback. The information about the content can be shared with an outside server and monetized in many different fashions. Based on additional information available in the media guide, it may also be possible to identify content that has been cataloged from legitimate sources that have contracts with the copyright owner versus those which are delivered from an illegitimate source. This identification can lead to monetization models such as advertisement, directed advertisement, offers for sale or acquisition of license to consume the content, or any other monetization techniques that can utilize information regarding the legitimacy of the delivery source of the media.

Some or all of the software and system required for the creation of the media guide may be implemented in a fashion that it can be licensed by $3^{rd}$ parties as a standard development kit (SDK) and subsequently customized by the $3^{rd}$ party licensor based on their specific requirements. In such a model, certain information that can be used for monetization such as the user's viewing preferences and the types of content that they like to playback along with additional information available in the media guide may be reported exclusively back to the licensee of the SDK, or shared mutually between the $3^{rd}$ party licensor and the licensee of the SDK.

Although the present invention has been described in certain specific aspects, many additional modifications and variations would be apparent to those skilled in the art. It is therefore to be understood that the present invention may be practiced otherwise than specifically described, including various changes in the size, shape and materials, without departing from the scope and spirit of the present invention. Thus, embodiments of the present invention should be considered in all respects as illustrative and not restrictive.

The invention claimed is:

1. A content guide system comprising:
one or more content servers configured to provide access to content;
a tag server including a searchable database of tags referencing accessible content stored on at least one content server, where the tag server is separate from the content servers;
a tagging device in network communication with the tag server and the content server, wherein:
the tagging device is configured to access content via at least one content server;
the tagging device is configured to automatically generate at least one tag referencing the accessed content that is provided to the tag server for inclusion into the searchable database of tags; and
the tagging device is separate from the content server and tag server; and
a playback device separate from the content server and tag server in network communication with the tag server and the content server, wherein:
the playback device is configured to display a content guide comprising tags retrieved from the tag server;
the playback device is configured to access the content referenced by the selected tag utilizing the content server;
the playback device is configured to receive a content recommendation;
the playback device is configured to request a tag referencing content to be added to the database based on the content recommendation; and the playback device is separate from the content server and tag server.

2. The content guide system of claim 1, wherein each tag includes an identifier of the content and location information of the content.

3. The content guide system of claim 2, wherein the identifier is a unique database identifier and the location information is associated to a uniform resource identifier.

4. The content guide system of claim 1 wherein the identifier and the location information is substantially smaller in size than the content.

5. The content guide system of claim 1 wherein the playback device is configured to request a tag referencing content stored on the content server to be added to or deleted from the database.

6. The content guide system of claim 1 wherein the network communication is through the Internet.

7. The content guide system of claim 1 wherein the network communication is through a local area network.

8. The content guide system of claim 1 further comprising a recommendation server configured to search through the database and to transmit content recommendations to the playback device.

9. The content guide system of claim 1 wherein the content recommendation is based on a selection criteria and the playback device is configured to create the selection criteria.

10. The content guide system of claim 1 wherein the playback device is configured to receive pre-cached portions of the content.

11. The content guide system of claim 1 wherein the content server is configured to obtain pre-cached portions of the content.

12. The content guide system of claim 1 wherein the tag server does not contain the content.

13. The content guide system of claim 1 wherein the content server stores a portion of the content.

14. The content guide system of claim 1 wherein the tags does not include a temporal component.

15. The content guide system of claim 1 wherein the tags are a subset of data within a database having data unrelated to the tags and the content in which the tags refer.

16. The content guide system of claim 15 wherein the tags include at least one identifier associating the tags to a specific content guide within the database.

17. The content guide system of claim 16 wherein the database is larger in size than the database of tags.

18. A method of accessing content distributed throughout a network, the method comprising:
   accessing content via at least one content server using a tagging device, where the tagging device is separate from the at least one content server;
   generating at least one tag referencing the accessed content using the tagging device;
   providing the at least one tag to a tag server for inclusion into a searchable database of tags using the tagging device, where the tag sever is separate from the content server and the tagging device;
   displaying a content guide comprising tags retrieved from the tag server using a playback device, where the playback device is separate from the content server and the tag server;
   accessing the content referenced by a selected tag using the playback device; and
   receiving a content recommendation using the playback device; and
   requesting a tag referencing content to be added to the searchable database of tags based on the content recommendation using the playback device.

19. The method of claim 18 wherein each tag includes an identifier of the content and location information of the content.

20. The method of claim 18 wherein the identifier is a unique database identifier and the location information is associated to a uniform resource identifier.

21. The method of claim 18 wherein the identifier and the location information is substantially smaller in size than the content.

* * * * *